United States Patent
Gao

(10) Patent No.: US 10,563,976 B2
(45) Date of Patent: Feb. 18, 2020

(54) METHOD AND SYSTEM FOR DETECTING A GAUGE OF A METRO VEHICLE

(71) Applicant: Traffic Control Technology Co., Ltd, Beijing (CN)

(72) Inventor: Chunhai Gao, Beijing (CN)

(73) Assignee: Traffic Control Technology Co., Ltd, Beijing (CN)

(*) Notice: Subject to any disclaimer, the term of this patent is extended or adjusted under 35 U.S.C. 154(b) by 50 days.

(21) Appl. No.: 16/004,999

(22) Filed: Jun. 11, 2018

(65) Prior Publication Data
US 2019/0301856 A1 Oct. 3, 2019

(30) Foreign Application Priority Data

Apr. 2, 2018 (CN) .......................... 2018 1 0281908

(51) Int. Cl.
*G01B 11/16* (2006.01)
*B61L 1/20* (2006.01)
(Continued)

(52) U.S. Cl.
CPC ................ *G01B 11/16* (2013.01); *B61L 1/20* (2013.01); *B61L 27/0088* (2013.01); *B61D 15/12* (2013.01)

(58) Field of Classification Search
CPC ........ G01B 11/16; B61L 1/20; B61L 27/0088; B61D 15/12
See application file for complete search history.

(56) References Cited

U.S. PATENT DOCUMENTS

| | | | | |
|---|---|---|---|---|
| 6,474,489 B2* | 11/2002 | Payne | ..................... | B61F 19/06 105/392.5 |
| 6,619,491 B2* | 9/2003 | Payne | ..................... | B61F 19/06 105/392.5 |

(Continued)

FOREIGN PATENT DOCUMENTS

| | | |
|---|---|---|
| CN | 1527237 A | 9/2004 |
| CN | 102941864 A | 2/2013 |

(Continued)

OTHER PUBLICATIONS

The First Official Action and search report dated Feb. 25, 2019 for Chinese application No. 201810281908.2, 8 pages.

*Primary Examiner* — Russell Frejd
(74) *Attorney, Agent, or Firm* — Law Offices of Liaoteng Wang

(57) ABSTRACT

The present disclosure provides a method and system for detecting a gauge of a metro vehicle. The method includes obtaining a plurality of partial three-dimensional contour images and a first identification information of the vehicle during a course of the vehicle passing through a transition track; processing the plurality of partial three-dimensional contour images of the vehicle to get a complete three-dimensional contour image of the vehicle; determining a gauge judgment result of the vehicle according to the first identification information, a preset gauge standard image library and a complete three-dimensional contour image of the vehicle; and sending the gauge judgment result of the vehicle to an Automatic Train Supervision (ATS) module. With the method and system for detecting the gauge of the metro vehicle, the efficiency of the vehicle gauge detection is improved and the automatic vehicle gauge detection is achieved.

14 Claims, 3 Drawing Sheets

100

Obtain a plurality of partial three-dimensional contour images and a first identification information of the vehicle during a course of the vehicle passing through a transition track — S110

Process the plurality of partial three-dimensional contour images of the vehicle to get a complete three-dimensional contour image of the vehicle — S120

Determine a gauge judgment result of the vehicle according to the first identification information, a preset gauge standard image library and a complete three-dimensional contour image of the vehicle — S130

Send the gauge judgment result of the vehicle to an ATS module — S140

(51) Int. Cl.
*B61L 27/00* (2006.01)
*B61D 15/12* (2006.01)

(56) References Cited

U.S. PATENT DOCUMENTS

| | | | | |
|---|---|---|---|---|
| 2003/0075071 | A1* | 4/2003 | Fleury | B61F 5/22 |
| | | | | 105/198.2 |
| 2014/0142868 | A1* | 5/2014 | Bidaud | G01N 21/8803 |
| | | | | 702/40 |
| 2017/0067733 | A1* | 3/2017 | Wei | G01B 11/24 |
| 2019/0256113 | A1* | 8/2019 | Filippone | B61L 3/227 |

FOREIGN PATENT DOCUMENTS

| | | |
|---|---|---|
| CN | 104374335 A | 2/2015 |
| CN | 104463235 A | 3/2015 |
| CN | 104477216 A | 4/2015 |
| CN | 103162639 B | 6/2015 |
| CN | 103854320 B | 6/2016 |
| CN | 107300358 A | 10/2017 |
| CN | 206537290 U | 10/2017 |

* cited by examiner

METHOD AND SYSTEM FOR DETECTING A GAUGE OF A METRO VEHICLE

CROSS-REFERENCE TO RELATED APPLICATION

This application is based upon and claims priority to Chinese Patent Application No. 201810281908.2, filed on Apr. 2, 2018, the content of which is incorporated herein by reference in its entirety.

TECHNICAL FIELD

The present disclosure relates to the technical field of rail transportation, and particularly to a method and a system for detecting a gauge of a metro vehicle.

BACKGROUND

The gauge refers to a borderline that is not allowed to be exceeded by locomotives and buildings and equipment close to a track line in order to ensure safety of the locomotives operating on the track line and prevent the locomotives from colliding with the buildings and equipment close to the track line. During long-term operations of a train on the track line, there may be situations where the train body is out of shape or a cable on the train roof falls down. When the train is operating in such situations, a part of the train out of the gauge may easily collide with or hook surrounding objects, which may cause hidden risks in the operation of the train. Here, the out-of-gauge part refers to an area beyond the gauge due to causes such as a protruding deformation of the train body or the falling down of the roof cable. Therefore, it is necessary to perform a gauge detection for a metro vehicle when the metro vehicle gets in-storage or out-of-storage, so as to ensure that the vehicle has no safety risk.

At present, most metro vehicles need to perform a return operation after completing an operating task. That is, a dispatcher will transfer the vehicles to a depot in sequence. Currently, the Communication Based Train Control. System (CBTC) does not have the capability of gauge detection. The details of each vehicle are mostly confirmed by a driver or a ground maintenance personnel after the vehicle returns to the depot. Due to poor working environment, working hours and other reasons, inspectors may have problems such as lack of concentration, easy to sleepy, and difficulty in distinguishing subtle errors during the inspection for the returned vehicles, and thus the inspection may be unstable because of different conditions of the inspectors. Therefore, the inspection conducted by the inspectors for the vehicles to be in-storage or out-of-storage may have low efficiency of gauge detection.

SUMMARY

In view of the above problems, a method and a system for detecting a gauge of a metro vehicle are provided in embodiments of the present disclosure.

According to an aspect of the embodiments of the present disclosure, a method for detecting a gauge of a metro vehicle is provided. The method includes obtaining a plurality of partial three-dimensional contour images and a first identification information of the vehicle during a course of the vehicle passing through a transition track; processing the plurality of partial three-dimensional contour images of the vehicle to get a complete three-dimensional contour image of the vehicle; determining a gauge judgment result of the vehicle according to the first identification information, a preset gauge standard image library and a complete three-dimensional contour image of the vehicle; and sending the gauge judgment result of the vehicle to an Automatic Train Supervision (ATS) module.

In an embodiment, the obtaining the plurality of partial three-dimensional contour images and the first identification information of the vehicle during the course of the vehicle passing through the transition track includes obtaining the plurality of partial three-dimensional contour images of the vehicle that are detected by a laser scanning surface emitted by a three-dimensional laser radar during the course of the vehicle passing through the transition track; and receiving the first identification information of the vehicle transmitted by the ATS module, wherein the first identification information of the vehicle includes a model number of the vehicle.

In an embodiment, before obtaining the plurality of partial three-dimensional contour images of the vehicle that are detected by the laser scanning surface emitted by the three-dimensional laser radar during the course of the vehicle passing through the transition track, the method further includes receiving a signal sent by the ATS module indicating the vehicle enters the transition track; and sending the signal to the three-dimensional laser radar.

In an embodiment, the processing the plurality of partial three-dimensional contour images of the vehicle to get the complete three-dimensional contour image of the vehicle includes stitching the plurality of partial three-dimensional contour images of the vehicle to get the complete three-dimensional contour image of the vehicle.

In an embodiment, the determining the gauge judgment result of the vehicle according to the first identification information, the preset gauge standard image library and the complete three-dimensional contour image of the vehicle includes obtaining a gauge standard image corresponding to the vehicle from the gauge standard image library in accordance with the first identification information of the vehicle; comparing the complete three-dimensional contour image of the vehicle with the gauge standard image corresponding to the vehicle to determine a differential region of the complete three-dimensional contour image of the vehicle and the gauge standard image corresponding to the vehicle; and determining the gauge judgment result of the vehicle based on a surface area and/or a volume of the differential region or based on a dimension of the differential region.

In an embodiment, the method further includes controlling, via the ATS module, the vehicle to pass through the transition track when the gauge judgment result is normal; and controlling, via the ATS module, the vehicle to stop passing through the transition track when the gauge judgment result is abnormal.

In an embodiment, the controlling, via the ATS module, the vehicle to stop passing through the transition track when the gauge judgment result is abnormal includes: controlling, via the ATS module, the vehicle to stop passing through the transition track and enter a depot for maintenance; or controlling, via the ATS module, the vehicle to stop passing through the transition track, so that a gauge detection is to be performed for the vehicle again after maintenance of the vehicle on the transition track.

In an embodiment, after getting the complete three-dimensional contour image of the vehicle, the method further includes identifying the complete three-dimensional contour image of the vehicle by an image identification process; and assigning identification information to the vehicle according to an identified result.

In an embodiment, after assigning the identification information to the vehicle according to the identified result, the method further includes obtaining a vehicle number of the vehicle; and storing the complete three-dimensional contour image of the vehicle in a database according to the vehicle number and the identification information of the vehicle, wherein the database includes complete three-dimensional contour images of all detected vehicles.

In an embodiment, when the gauge judgment result of the vehicle is normal, after storing the complete three-dimensional contour image of the vehicle in the database, the method further includes performing a failure prediction for the vehicle according to the database and a big data analysis process; and sending a failure prediction result to the ATS module.

In an embodiment, the gauge standard image library includes a complete three-dimensional contour image of a normal vehicle having different first identification information when running at a preset constant speed.

In an embodiment, the gauge standard image library includes a first gauge standard image sub-library and a second gauge standard image sub-library; the first gauge standard image sub-library includes a complete three-dimensional contour image of the normal vehicle having different first identification information when running at a first preset constant speed; and the second gauge standard image sub-library includes a complete three-dimensional contour image of the normal vehicle having different first identification information when running at a second preset constant speed.

According to another aspect of the embodiments of the present disclosure, a system for detecting a gauge of a metro vehicle is provided. The system includes a three-dimensional laser radar, a server and an Automatic Train Supervision (ATS) module. The three-dimensional laser radar is configured to detect a plurality of partial three-dimensional contour images of the vehicle by using an emitted laser scanning surface during a course of the vehicle passing through a transition track, and send the plurality of partial three-dimensional contour images of the vehicle to the server. The server is configured to obtain the plurality of partial three-dimensional contour images and a first identification information of the vehicle during the course of the vehicle passing through the transition track, process the plurality of partial three-dimensional contour images of the vehicle to get a complete three-dimensional contour image of the vehicle, determine a gauge judgment result of the vehicle according to the first identification information, a preset gauge standard image library and a complete three-dimensional contour image of the vehicle, and send the gauge judgment result of the vehicle to the ATS module. The ATS module is configured to receive the gauge judgment result of the vehicle and send the first identification information of the vehicle to the server.

In an embodiment, the system includes a first group of three-dimensional laser radars and a second group of three-dimensional laser radars, and the transition track includes an up transition track and a down transition track. The first group of three-dimensional laser radars are configured to detect a plurality of partial three-dimensional contour images of the vehicle during a course of the vehicle passing through the up transition track. The second group of three-dimensional laser radars are configured to detect a plurality of partial three-dimensional contour images of the vehicle during a course of the vehicle passing through the down transition track. The first group of three-dimensional laser radars and the second group of three-dimensional are connected with the server.

In an embodiment, the first group of three-dimensional laser radar includes a first three-dimensional laser radar, a second three-dimensional laser radar and a third three-dimensional laser radar. The first three-dimensional laser radar is disposed above the up transition track. The second three-dimensional laser radar and the third three-dimensional laser radar are respectively disposed at two sides of the up transition track. The second group of three-dimensional laser radar includes a fourth three-dimensional laser radar, a fifth three-dimensional laser radar and a sixth three-dimensional laser radar. The fourth three-dimensional laser radar is disposed above the down transition track. The fifth three-dimensional laser radar and the sixth three-dimensional laser radar are respectively disposed at two sides of the down transition track.

BRIEF DESCRIPTION OF THE DRAWINGS

To illustrate technical solutions in one or more embodiments of the present disclosure more clearly, a brief introduction on the drawings which are needed in the description of the embodiments of the present disclosure is given below. Other drawings may be obtained by those of ordinary skill in the art without any creative effort in accordance with these drawings.

DETAILED DESCRIPTION

Figure 1:
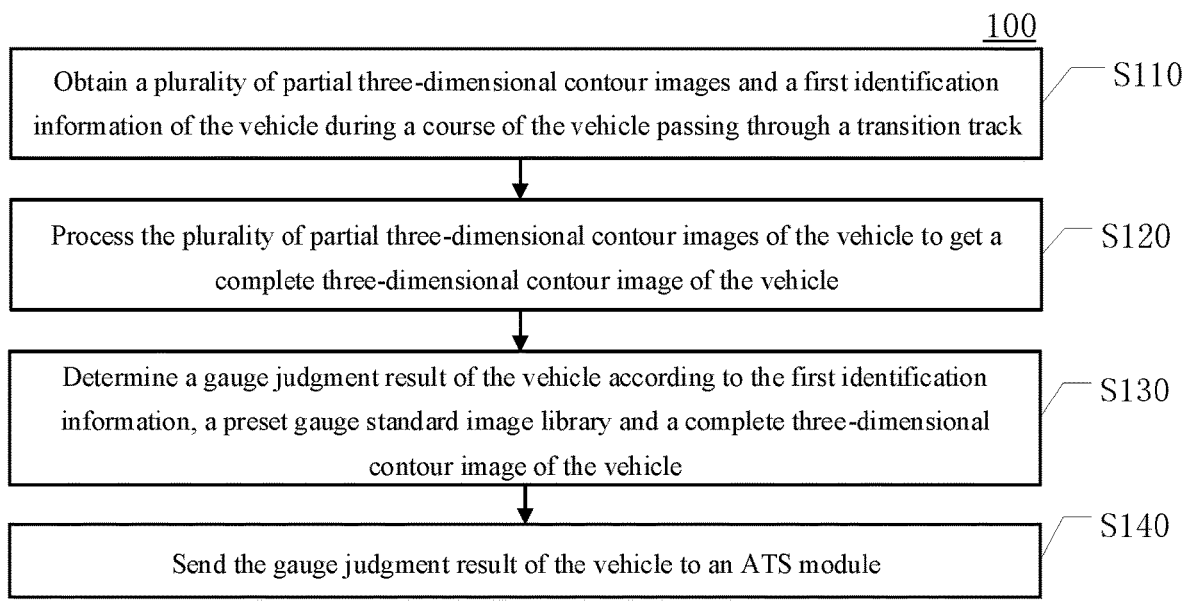
FIG. 1 shows a schematic flow chart of a method for detecting a gauge of a metro vehicle provided in an embodiment of the present disclosure.

The features and exemplary embodiments of various aspects of the present disclosure will be described in detail below. To make the objectives, technical solutions and advantages of the present application more apparent, the present application will be further described below in detail with reference to the drawings and embodiments. It should be understood that the specific embodiments described herein are only configured to explain the present application and are not configured to limit the present application. To those skilled in the art, the present application may be practiced without some of these specific details. The following description of the embodiments is merely intended to provide a better understanding of the present disclosure by illustrating examples of the present disclosure.

It should be noted that relational terms such as first, second and the like herein are only used to distinguish an entity or operation from another entity or operation, and do not require or imply these entities or operations have any such actual relationship or order. Moreover, the terms "comprise", "include" or any other variation thereof are intended to cover a nonexclusive inclusion, such that a process, a method, an article or a device that includes a series of elements includes not only those elements but also includes other elements that are not explicitly listed, or further includes elements inherent to such a process, method, article or device. In the case of no more limitation, the element defined by the phrase "include . . . " does not exclude that there are other same elements existing in the process, the method, the article or the device including the element.

During long-term operations of a metro vehicle on a track line, there may be situations where the vehicle body is out of shape or a cable on the vehicle roof falls down. When the vehicle is operating in such situations, a part of the vehicle out of the gauge may easily collide with or hook surrounding objects, which may cause hidden risks in the operation of the vehicle.

In view of these issues, embodiments of the present disclosure provide a method and a system for detecting the gauge of the metro vehicle. When the vehicle passes through a transition track, a plurality of partial three-dimensional contour images of the vehicle are processed to get a complete three-dimensional contour image of the vehicle. The complete three-dimensional contour image of the vehicle is compared with a corresponding gauge standard image of the vehicle to determine a gauge judgment result of the vehicle. The gauge judgment result is sent to an Automatic Train. Supervision (ATS) module, so that according to the gauge judgment result of the vehicle, the ATS module can determine whether the vehicle can normally pass through the transition track, that is, whether the vehicle can get in-storage or out-of-storage normally.

With the method and system for detecting the gauge of the metro vehicle provided in the embodiments of the present disclosure, it is possible to avoid safety risk when the vehicle gets out-of-storage, improve the operation safety of the vehicle and the efficiency of the vehicle gauge detection, and meanwhile realize an automatic vehicle gauge detection.

FIG. 1 shows a schematic flow chart of a method for detecting a gauge of a metro vehicle provided in an embodiment of the present disclosure. As shown in FIG. 1, the method 100 for detecting the gauge of the metro vehicle may include the following steps.

At S110, when the vehicle passes through the transition track, a plurality of partial three-dimensional contour images and a first identification information of the vehicle may be obtained.

In the embodiment of the present disclosure, the step S110 may include the following steps.

At S1101, when the vehicle passes through the transition track, the plurality of partial three-dimensional contour images of the vehicle may be obtained, wherein the plurality of partial three-dimensional contour images of the vehicle are detected by a laser scanning surface emitted by a three-dimensional laser radar.

In the embodiment of the present disclosure, the transition track is a transition segment between a metro line and a depot. Here, the travel line refers to a line connecting stations and running through or straight into the stations; and the depot refers to a location of a management center where vehicles are parked, inspected, prepared, used and repaired. The transition track is set between the travel line and the depot, which is used for the conversion of a control mode of the vehicle. When the vehicle gets out-of-storage (i.e., out of the depot), the conversion from a non-CBTC (Communication Based Train Control System) mode to a CBTC mode is realized; and when the vehicle gets in-storage, the conversion from the CBTC mode to the non-CBTC mode is realized.

In the embodiment of the present disclosure, the three-dimensional laser radar can emit multiple laser pulse beams at different angles on a preset plane, thereby forming a fan-shaped laser region, i.e., a laser scanning surface, in the preset plane. The laser scanning surface may be controlled to perform a rotational scan, and a signal reflected from a target may be compared with an emitted signal to obtain a distance between the three-dimensional laser radar and the target and a three-dimensional contour image of the target.

In the embodiment of the present disclosure, due to factors such as a scanning angle and a detection distance of the three-dimensional laser radar, the three-dimensional laser radar detects a plurality of partial three-dimensional contour images of the vehicle. In the course of the vehicle passing through the transition track, the three-dimensional laser radar emits the laser scanning surface, and continuously rotates the laser scanning surface to perform the three-dimensional scanning detection on the operating vehicle, so as to acquire the plurality of partial three-dimensional contour images of the vehicle.

The method for detecting the gauge of the metro vehicle provided by the embodiment of the present disclosure applies a three-dimensional laser radar imaging technology and has significant advantages in human-machine interaction. When detecting a gauge invasion event of the vehicle, a staff can make a secondary confirmation on the gauge invasion event more intuitively and efficiently, improving timeliness and accuracy of manual verification.

The device for acquiring the plurality of partial three-dimensional contour images of the vehicle is not limited to the three-dimensional laser radar, as long as the three-dimensional contour image of the vehicle can be acquired.

At S1102, the first identification information of the vehicle sent by the ATS module may be received. Here, the first identification information of the vehicle may include a model number of the vehicle.

In the embodiment of the present disclosure, gauge standards for different types of vehicles may be different. Thus in order to determine whether a specific vehicle goes beyond the gauge, a measured complete three-dimensional contour image of the vehicle needs to be compared with a gauge standard image corresponding to the vehicle. Therefore, it is necessary to obtain the first identification information of the vehicle from the ATS module, so as to determine the gauge standard image corresponding to the vehicle according to the first identification information of the vehicle.

In the embodiment of the present disclosure, the first identification information of the vehicle includes the model number of the vehicle. The first identification information of the vehicle will not be particularly limited in the embodiment of the present disclosure, as long as the gauge standard images of different vehicles can be distinguished.

At S120, the plurality of three-dimensional contour images of the vehicle may be processed to get the complete three-dimensional contour image of the vehicle.

In the embodiment of the present disclosure, the step S120 may include the step of stitching the plurality of partial three-dimensional contour images of the vehicle to get the complete three-dimensional contour image of the vehicle.

In the embodiment of the present disclosure, image stitching is a process of combining multiple images having overlapping portions to produce a seamless image. The image stitching process includes two key processes of image matching and image fusion.

First, the image matching process is applied to determine a correspondence between the images to be stitched. The image matching process is a process of identifying points having a same name among two or more images through a certain matching algorithm. The image matching generally includes feature-independent correlation matching and local feature matching.

In the correlation matching, some similarity measure may be adopted to determine panning or scaling parameters between the images to be stitched, and an image stitching operation may be performed according to the parameters. Here, the correlation matching includes grayscale template matching.

In the local feature matching, feature information of two or more images may be extracted, corresponding feature information in the two or more images may be identified to perform the matching between the images, and then the entire image may be speculated. Here, the feature information includes information such as a feature contour, a feature curve, or a feature point. As an example, after extracting the feature point information of the images to be stitched, a homography matrix may be estimated according to the matched feature points between the images to be stitched. The homography matrix represents the relationship between the images to be stitched. According to the homography matrix, any pixel coordinate of the image to be stitched can be converted into a new coordinate point, and the converted image may be an image suitable for stitching.

Then, according to the correspondence between the images to be stitched, a mathematical transformation model for the images to be stitched may be established, and a unified coordinate transformation may be realized.

Finally, with the image fusion process, the overlapping regions of the images to be stitched are fused to obtain a stitched and reconstructed complete image. The commonly used methods of image fusion include an average superposition method, a linear method, a weighting method and a multi-segment fusion method, etc. The image fusion process determines the quality of the final synthetic image.

Optionally, an algorithm such as Scale Invariant Feature Transform (SIFT), Features from Accelerated Segment Test (FAST) or Speeded Up Robust (SURF) can be adopted as the algorithm for feature point detection during image matching. The algorithm for image matching is not specifically limited in the embodiments of the present disclosure.

In order to increase the speed of image fusion, optionally, an average superposition method may be used in the image fusion process. The method for image fusion is not specifically limited in the embodiments of the present disclosure, as long as the fusion of the images to be stitched can be realized.

In an embodiment of the present disclosure, with the image stitching process, a plurality of partial three-dimensional contour images of a vehicle may be stitched into a complete three-dimensional contour image of the vehicle. The method for processing a plurality of partial three-dimensional contour images of a vehicle to get a complete three-dimensional contour image of the vehicle is not limited in the embodiments of the present disclosure and may be determined according to a specific application scenario.

At S130, a gauge judgment result of the vehicle may be determined according to the first identification information, a preset gauge standard image library and a complete three-dimensional contour image of the vehicle.

In an embodiment of the present disclosure, the step S130 may include obtaining a gauge standard image corresponding to the vehicle from the gauge standard image library in accordance with the first identification information of the vehicle at S1301.

In an embodiment of the present disclosure, the gauge standard image library includes complete three-dimensional contour images of normal vehicles having different first identification information when running at a preset constant speed. As an example, the first identification information is a model of the vehicle. In accordance with different models, the pre-measured complete three-dimensional contour images of normal vehicles of different models when running at a preset constant speed may be stored in the gauge standard image library.

According to the obtained first identification information of the vehicle, the gauge standard image corresponding to the vehicle can be found from the preset gauge standard image library to determine whether the vehicle exceeds the gauge.

Here, in order to obtain the preset gauge standard image library, it is necessary to firstly classify normal vehicles of different models in the depot, and then make the normal vehicles of different models to pass through an image acquisition area covered by the three-dimensional laser radar sequentially from far to near along the transition track.

Further, in order to improve the accuracy of the vehicle gauge detection, the gauge standard image library includes a first gauge standard image sub-library and a second gauge standard image sub-library. The first gauge standard image sub-library includes complete three-dimensional contour images of the normal vehicles having different first identification information when running at a first preset constant speed. The second gauge standard image sub-library includes complete three-dimensional contour images of the normal vehicles having different first identification information when running at a second preset constant speed.

As an example, the first preset speed is a standard speed that is consistent with the speed at which the vehicle enters the transition track. The second preset speed is a half of the first preset speed. Relative to the standard speed, the second preset speed is a low speed, and the standard speed is a high speed. That is, according to the difference in the running speed of the vehicle, the gauge standard image library may be divided into a high-speed gauge standard image sub-library and a low-speed gauge standard image sub-library.

In order to obtain the gauge standard image library including the first gauge standard image sub-library and the second gauge standard image sub-library, the vehicles need to be classified according to their models, and then the normal vehicles of different models are controlled to pass through the transition track at different speeds.

The preset speed is not specifically limited in the embodiments of the present disclosure and may be determined according to a specific application scenario.

At S1302, the complete three-dimensional contour image of the vehicle may be compared with the gauge standard image corresponding to the vehicle to determine a differential region of the complete three-dimensional contour image of the vehicle and the gauge standard image of the vehicle.

In an embodiment of the present disclosure, by comparing the complete three-dimensional contour image of the vehicle with the gauge standard image of the vehicle, it can be determined whether there is a differential region between the complete three-dimensional contour image of the vehicle and the gauge standard image of the vehicle, and the gauge judgment result of the vehicle can be determined according to the differential region.

The way of comparison between the complete three-dimensional contour image of the vehicle and the gauge standard image of the vehicle is not specifically limited in the embodiments of the present disclosure, as long as the difference between them can be found.

At S1303, the gauge judgment result of the vehicle may be determined based on a surface area and/or a volume of the differential region or based on a dimension of the differential region.

In an embodiment of the present disclosure, if the complete three-dimensional contour image of the vehicle is consistent with the gauge standard image corresponding to the vehicle, there is no differential region. It means that the vehicle does not exceed the gauge, that is, the gauge judgment result of the vehicle is normal.

If there is a differential region between the complete three-dimensional contour image of the vehicle and the gauge standard image corresponding to the vehicle, the gauge judgment result of the vehicle is abnormal. When the judgment result of the gauge of the vehicle is abnormal, it means there is an out-of-gauge event or a suspicious event. Therefore, it is necessary to further determine a specific gauge determination result of the vehicle based on the differential region. Specifically, the gauge judgment result of the vehicle may be determined according to the surface area and/or the volume of the different region or the dimension of the differential region.

In order to improve the accuracy of the vehicle gauge detection, a gauge standard image library including a first gauge standard image sub-library and a second gauge standard image sub-library may be used to determine the gauge judgment result of the vehicle. The first preset speed is 2 times the second preset speed. The first gauge standard image corresponding to the vehicle running on the transition track at the first preset speed is included in the first gauge standard image sub-library. The second gauge standard image corresponding to the vehicle running on the transition track at the second preset speed is included in the second gauge standard image sub-library.

The determination of the gauge judgment result of the vehicle will be described below with reference to an example. Firstly, the complete three-dimensional contour image of the vehicle running at the first preset speed is compared with the corresponding first gauge standard image in the first gauge standard image sub-library to determine a first differential region.

If a ratio of the surface area of the first differential region to the surface area of the vehicle in the first gauge standard image is greater than or equal to a first preset threshold, or a ratio of the volume of the first differential region to the volume of the vehicle in the first gauge standard image is greater than or equal to a second preset threshold, it is determined that the vehicle exceeds the gauge, i.e., an out-of-gauge event occurs.

If the ratio of the surface area of the first differential region to the surface area of the vehicle in the first gauge standard image is smaller than the first preset threshold, or the ratio of the volume of the first differential region to the volume of the vehicle in the first gauge standard image is smaller than the second preset threshold, it is determined that a suspicious event occurs at the vehicle.

As a specific example, both the first preset threshold and the second preset threshold are 1%. Alternatively, the gauge judgment result of the vehicle may also be determined according to both the surface area and the volume of the differential region.

In addition, the gauge judgment result of the vehicle may also be determined according to the dimension of the first differential region. For example, if a length of the first differential region in a preset direction is greater than or equal to a third preset threshold, it is determined that the vehicle exceeds the gauge, that is, an out-of-gauge event occurs at the vehicle. Otherwise, it is determined that a suspicious event occurs at the vehicle. As a specific example, the third preset threshold is 2 cm. The selection of the third preset threshold and the dimension of the first differential region is not specifically limited in the embodiments of the present disclosure.

If it is determined according to the first gauge standard image corresponding to the vehicle that an out-of-gauge event occurs at the vehicle, the gauge judgment result is sent to the ATS module. If it is determined that a suspicious event occurs at the vehicle, the vehicle is controlled to pass through the transition track at the second preset speed. In other words, the complete three-dimensional contour image of the vehicle is further compared with a corresponding second gauge standard image in the second gauge standard image sub-library to determine the second differential region. Then, the gauge judgment result of the vehicle is further determined according to the second differential region.

Specifically, if a ratio of the surface area of the second differential region to the surface area of the vehicle in the second gauge standard image is greater than or equal to a fourth preset threshold, it is determined that the vehicle exceeds the gauge, that is, an out-of-gauge event occurs at the vehicle. If the ratio of the surface area of the second differential region to the surface area of the vehicle in the second gauge standard image is less than the fourth preset threshold, it is determined that a suspicious event occurs at the vehicle. The fourth preset threshold is less than the first preset threshold. As a specific example, the fourth preset threshold is a half of the first preset threshold, i.e., 0.05%.

Optionally, the gauge judgment result of the vehicle may also be determined according to the volume of the second differential region and a fifth preset threshold, or according to the dimension of the second differential region and a sixth preset threshold. The fifth preset threshold is less than the second preset threshold, and the sixth preset threshold is less than the third preset threshold. That is, the accuracy of the vehicle gauge detection can be improved by further limiting judgment conditions.

The first preset threshold, the second preset threshold, the third preset threshold, the fourth preset threshold, the fifth preset threshold, and the sixth preset threshold will not be specifically limited in the embodiments of the present disclosure and may be determined depending on a specific application scenario.

In an embodiment of the present disclosure, the gauge judgment result of the vehicle may be determined according to a unique gauge standard image corresponding to the vehicle in the gauge standard image library, which does not affect the implementation of the embodiment of the present disclosure.

At S140, the gauge judgment result of the vehicle may be sent to the ATS module.

In an embodiment of the present disclosure, after determining the gauge judgment result of the vehicle, the gauge judgment result of the vehicle is sent to the ATS module.

If the gauge judgment result of the vehicle is normal, the ATS module controls the vehicle to pass through the transition track, that is, the vehicle is normally out-of-storage or in-storage.

If the gauge judgment result of the vehicle is abnormal, the ATS module controls the vehicle to stop passing through the transition track.

Specifically, if an out-of-gauge event occurs at the vehicle and the out-of-gauge event is too severe to be overcome in a short time, for example, if the shape of the vehicle has a huge deformation, the ATS module controls the vehicle to stop passing through the transition track and enter the depot for maintenance, i.e., does not allow the vehicle to get in-storage or out-of-storage.

If an out-of-gauge event occurs at the vehicle but the out-of-gauge event is not severe and can be quickly overcome, for example, if the roof cable falls down, the ATS module controls the vehicle to stop operating on the transition track so that the vehicle can be repaired on the transition track. After the vehicle is repaired, the ATS module controls the vehicle to drive into the transition track again for gauge detection.

Similarly, if a suspicious event occurs at the vehicle, the ATS module controls the vehicle to enter the depot or stop on the transition track for maintenance and then perform the gauge detection again, depending on the severity of the suspicious event.

The setting of the severity of the out-of-gauge event or the suspicious event may be determined according to a specific application scenario, which is not specifically limited in the embodiments of the present disclosure.

According to the method for the gauge detection of the metro vehicle provided in the embodiments of the present disclosure, different treatment measures may be adopted depending on different gauge judgment results of the vehicle, thereby improving the efficiency of the vehicle gauge detection.

With the method for the gauge detection of the metro vehicle provided in the embodiments of the present disclosure, harsh environment conditions in actual applications are fully considered. A three-dimensional laser radar sensor that can complete the vehicle gauge detection at a single end is adopted, effectively avoiding failures due to traditional double-ends sensor communication and interaction, reducing costs, improving reliability and facilitating post-maintenance.

In an embodiment of the present disclosure, before step S110, the following step S100 is also included.

At S100, a signal transmitted by the ATS module indicating the vehicle enters the transition track is received, and the signal is sent to the three-dimensional laser radar.

In the embodiment of the present disclosure, in order to improve resource utilization and reduce costs, the three-dimensional laser radar starts detection of the three-dimensional contour of the vehicle after receiving the signal from the ATS module indicating the vehicle enters the transition track.

In some embodiments of the present disclosure, after obtaining the complete three-dimensional contour image of the vehicle, the following step S150 is further included.

At S150, the complete three-dimensional contour image of the vehicle may be identified by an image identification process, and identification information may be assigned to the vehicle according to the identified result.

In an embodiment of the present disclosure, the image identification process refers to a process of performing an object identification on an image to identify targets and objects of various different patterns. The identification of each vehicle is realized by extracting feature information of the vehicle from the complete three-dimensional contour image of the vehicle.

In an embodiment of the present disclosure, complete three-dimensional contour images of all detected vehicles are stored in the server to build a database. In order to distinguish each vehicle in the database and apply the image identification process to identify a vehicle, identification information is assigned to the vehicle so as to mark different vehicles.

Specifically, the identification information includes a digit number, that is, different vehicles are distinguished with different digit numbers. The form of the identification information is not specifically limited in the embodiments of the present disclosure, as long as it can be used to distinguish each different vehicle in the database.

In an embodiment of the present disclosure, after identifying the complete three-dimensional contour image of the vehicle by the image identification process, the identified result of the vehicle needs to be compared with the identified results of all the vehicles stored in the database to assign the identification information of the vehicle.

If the identified result of the vehicle is not the same as the identified results of all the vehicles recorded in the database, it means that the vehicle has never performed the vehicle gauge detection, and the vehicle is assigned with identification information different from that of all the vehicles recorded in the database.

If the identified result of the vehicle is the same as the identified result of a first vehicle with first identification information in the database, it means that the vehicle is the first vehicle, and the first identification information of the first vehicle in the database is assigned to the vehicle.

In some embodiments of the present disclosure, after the step S150, the steps of obtaining a vehicle number of the vehicle; and storing the complete three-dimensional contour image of the vehicle in a database according to the vehicle number and the identification information of the vehicle are also included, wherein the database comprises complete three-dimensional contour images of all detected vehicles.

In an embodiment of the present disclosure, when the vehicle enters the transition track, the vehicle number of the vehicle can be obtained from the ATS module. The vehicle can also be marked by the vehicle number. According to the vehicle number and the identification information of the vehicle, the marking of the vehicle can be implemented from two different aspects, so that when the vehicle number is changed, each vehicle can still be distinguished according to the identification information of the vehicle.

In an embodiment of the present disclosure, the database includes not only the complete three-dimensional contour image of all the detected vehicles, but also the identification information of the vehicle, the vehicle number of the vehicle, the gauge judgment result of the vehicle, and the like.

In some embodiments of the present disclosure, when the gauge judgment result of the vehicle is normal, after storing the complete three-dimensional contour image of the vehicle in the database, the method further includes performing a failure prediction for the vehicle according to the database and a big data analysis process; and sending a failure prediction result to the ATS module.

In an embodiment of the present disclosure, when the vehicle gauge judgment result is normal, that is, before the vehicle gauge judgment result becomes abnormal, a big data analysis process and a big data mining process can be used to extract potential useful information, patterns and trends from a large amount of data in the database and make revision and analysis to perform the failure prediction for the vehicle and show failure possibilities of the vehicle. At the same time when the three-dimensional laser radar detects the vehicle, the server will make a corresponding analysis according to the deformation of the vehicle and record the analysis result.

In order to realize the failure prediction of the vehicle before the abnormal gauge judgment result of the vehicle occurs, the following steps need to be performed.

A. Preprocessing the Data in the Database.

In an embodiment of the present disclosure, the preprocessing mainly includes data screening and data collection.

Data collection and data screening refer to extracting valid feature information for the vehicle failure prediction from the database, and processing noise data and deleting redundant data. The feature information of the vehicle includes information such as out-of-gauge results of the vehicle at different stages, a failure rate of the vehicle in a same period of time, and a number of failures of the vehicle, etc. The above-mentioned failure means that the gauge judgment result of the vehicle is abnormal, and the out-of-gauge results include information such as an out-of-gauge region (differential region), parameters of the out-of-gauge region, and a severity of out-of-gauge, etc. By combining the vehicle number and a vehicle operation plan in the ATS module, it is possible to know the operating time of each vehicle, and it is thus possible to analyze which stage during the operation of the vehicle is prone to an out-of-gauge event.

The form and the number of the feature information for the vehicle failure prediction are not specifically limited in the embodiments of the present disclosure and may be determined according to a specific application scenario.

B. Storing the Feature Information for the Vehicle Failure Prediction.

In an embodiment of the present disclosure, the feature information of vehicles having different vehicle numbers or having different identification information extracted in step A is stored in a specific space in the database.

C. Establishing a Prediction Model.

In the embodiments of the present disclosure, a failure prediction model may be established by using the feature information extracted from the database for the failure prediction and an appropriate mining algorithm. The algorithms for establishing the failure prediction model include a regression analysis method, a neural network method and a web data mining method, etc. The regression analysis method may be applied to reflect temporal features of attribute values in a transaction database, and to generate a variable prediction function that maps data items to real values and eventually find out dependencies between variables or attributes.

The selection of the mining algorithm is not specifically limited in the embodiments of the present disclosure, as long as the failure prediction model can be established according to the information in the database.

Further, in order to improve the accuracy of the failure prediction, different mining algorithms can be used to establish different prediction models with the feature information extracted from the database, and determine the failure prediction result of the vehicle by jointly applying the different prediction models.

D. Visualizing the Failure Prediction Result.

In an embodiment of the present disclosure, a visualization process can be used to quickly and intuitively display the operating state of the vehicle and the failure prediction result of the vehicle. By applying the visualization process to display the failure prediction result, the intuitiveness and intelligence of the vehicle gauge detection can be enhanced, and the operation safety of the vehicle can also be improved.

In the embodiments of the present disclosure, the feature information for the vehicle failure prediction may be obtained from different dimensions according to the vehicle number and the identification information of the vehicle, thereby improving the accuracy of the failure prediction.

With the method for the vehicle gauge detection according to the embodiments of the present disclosure, the failure detection result may be sent to the ATS module, and the ATS module may send a notification to an on-site employee and an operating personnel. It is not needed to arrange a specific staff to track minor changes of the vehicle. In addition, it is possible to intuitively display the degree of deformation of the vehicle, the cause of out-of-gauge of the vehicle, the current state of the vehicle, as well as which specific maintenance work should be performed before an out-of-gauge event occurs, thereby improving the intelligence and safety of the vehicle gauge detection.

By predicting the failure of the vehicle, the maintenance cost of the entire life cycle of the equipment can be effectively reduced, the intuitiveness and intelligence of the detection can be improved, and the vehicle failure prediction can be achieved. Moreover, the method for the vehicle gauge detection can predict the failure of the vehicle, which can bring significant benefits to metro operations, reduce the cost of labor and facility operations and improve competitive advantages.

Figure 2:
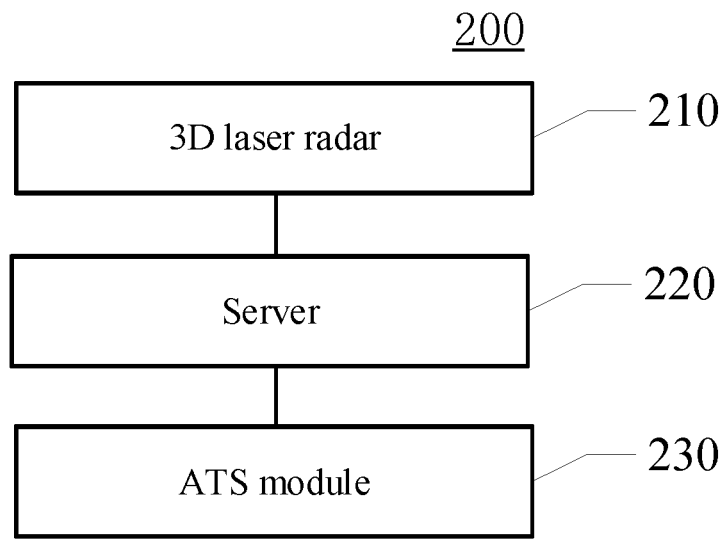
FIG. 2 shows a schematic system architecture of a system for detecting a gauge of a metro vehicle provided in an embodiment of the present disclosure.

FIG. 2 shows a schematic structural diagram of a system 200 for detecting a gauge of a metro vehicle according to an embodiment of the present disclosure. The system includes a three-dimensional laser radar 210, a server 220, and an ATS module 230.

The three-dimensional laser radar 210 is configured to detect a plurality of partial three-dimensional contour images of the vehicle by using an emitted laser scanning surface during the course of the vehicle passing through the transition track; and send the plurality of partial three-dimensional contour images of the vehicle to the server 220.

The server 220 is configured to acquire the plurality of partial three-dimensional contour images and a first identification information of the vehicle during the course of the vehicle passing through the transition track; process the plurality of partial three-dimensional contour images of the vehicle to obtain a complete three-dimensional contour image of the vehicle; determine a gauge judgment result according to the first identification information of the vehicle, a preset gauge standard image library and the complete three-dimensional contour image of the vehicle; and send the gauge judgment result of the vehicle to the ATS module 230.

The ATS module 230 is configured to receive the gauge judgment result of the vehicle and send the first identification information of the vehicle to the server 220.

In the embodiment of the present disclosure, the server 220 is specifically configured to acquire the plurality of partial three-dimensional contour images of the vehicle that are detected by the laser scanning surface emitted by the three-dimensional laser radar; and receive the first identification information of the vehicle transmitted by the ATS module, wherein the first identification information of the vehicle includes a model number of the vehicle.

In the embodiment of the present disclosure, the server 220 is further configured to receive a signal sent by the ATS module indicating the vehicle enters the transition track, and send the signal to the three-dimensional laser radar.

In the embodiment of the present disclosure, the server 220 is specifically configured to stitch the plurality of partial three-dimensional contour images of the vehicle to get the complete three-dimensional contour image of the vehicle.

In the embodiment of the present disclosure, the server 220 is specifically configured to obtain a gauge standard image corresponding to the vehicle from the gauge standard image library in accordance with the first identification information of the vehicle; compare the complete three-dimensional contour image of the vehicle with the gauge standard image corresponding to the vehicle to determine a differential region of the complete three-dimensional contour image of the vehicle and the gauge standard image of the vehicle; and determine the gauge judgment result of the vehicle based on a surface area and/or a volume of the differential region or based on a dimension of the differential region.

In the embodiment of the present disclosure, when the gauge judgment result is normal, the ATS module 230 controls the vehicle to pass through the transition track; and when the gauge judgment result is abnormal, the ATS module 230 controls the vehicle to stop passing through the transition track.

In the embodiment of the present disclosure, the ATS module 230 is specifically configured to control the vehicle to stop passing through the transition track and enter a depot for maintenance; or control the vehicle to stop passing through the transition track, so that a gauge detection is to be performed for the vehicle again after maintenance of the vehicle on the transition track.

In the embodiment of the present disclosure, the server 220 is further configured to identify the complete three-dimensional contour image of the vehicle by an image identification process; and assign identification information to the vehicle according to an identified result.

In the embodiment of the present disclosure, the server 220 is further configured to obtain a vehicle number of the vehicle; and store the complete three-dimensional contour image of the vehicle in a database according to the vehicle number and the identification information of the vehicle, wherein the database includes complete three-dimensional contour images of all detected vehicles.

In the embodiment of the present disclosure, when the gauge judgment result of the vehicle is normal, the server 220 is further configured to perform failure prediction for the vehicle according to the database and a big data analysis process; and send a failure prediction result to the ATS module.

The system for detecting the gauge of the metro vehicle provided in the embodiment of the present disclosure provides a guarantee for the safety of the system by performing failure prediction on a vehicle whose gauge judgment result is normal.

In the embodiment of the present disclosure, the gauge standard image library includes a complete three-dimensional contour image of a normal vehicle having different first identification information when running at a preset constant speed.

In the embodiment of the present disclosure, the gauge standard image library includes a first gauge standard image sub-library and a second gauge standard image sub-library. The first gauge standard image sub-library includes a complete three-dimensional contour image of the normal vehicle having different first identification information when running at a first preset constant speed. The second gauge standard image sub-library includes a complete three-dimensional contour image of the normal vehicle having different first identification information when running at a second preset constant speed.

The system provided in the embodiment of the present disclosure realizes an automatic gauge detection for vehicles that need to be in-storage or out-of-storage, and improves the efficiency of the gauge detection of the metro vehicles and the operational safety of the vehicles.

Figure 3:
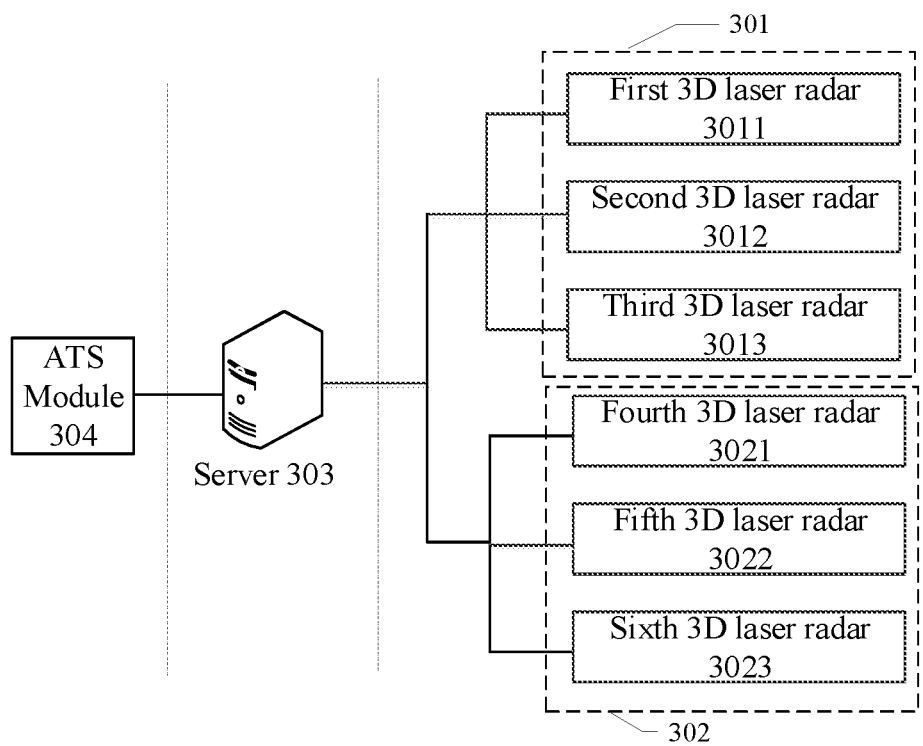
FIG. 3 shows a schematic system architecture of a system for detecting a gauge of a metro vehicle provided in another embodiment of the present disclosure.

The system for detecting the gauge of the metro vehicle provided by the embodiment of the present disclosure will be described below with reference to a specific example. FIG. 3 shows a schematic structural diagram of a system for detecting a gauge of a metro vehicle according to another embodiment of the present disclosure. The system includes a first group of three-dimensional laser radars 301 and a second group of three-dimensional laser radars 302, a server 303 and an ATS module 304.

In an embodiment of the present disclosure, a transition track includes an up transition track and a down transition track, which are respectively used for operations of up vehicles and down vehicles.

The first group of three-dimensional laser radars 301 include a first three-dimensional laser radar 3011, a second three-dimensional laser radar 3012, and a third three-dimensional laser radar 3013. The first group of three-dimensional laser radars 301 are used to detect a plurality of partial three-dimensional contour images of the vehicle when the vehicle passes through the up transition track.

The second group of three-dimensional laser radars 302 include a fourth three-dimensional laser radar 3021, a fifth three-dimensional laser radar 3022, and a sixth three-dimensional laser radar 3023. The second group of three-dimensional laser radars 302 are used to detect a plurality of partial three-dimensional contour images of the vehicle when the vehicle passes through the down transition track.

The three three-dimensional laser radars in the first group of three-dimensional laser radars 301 and the three three-dimensional laser radars in the second group of three-dimensional laser radars 302 are all connected to the server 303 through optical fibers.

The server 303 is configured to receive the plurality of partial three-dimensional contour images of the vehicle transmitted by the first group of three-dimensional laser radars 301 and the second group of three-dimensional laser radars 302, process the plurality of partial three-dimensional contour images of the vehicle to determine a gauge judgment result when the vehicle is operating on the up transition track or a gauge judgment result when the vehicle is operating on the down transition track, and send the gauge judgment results of the vehicle to the ATS module 304.

The ATS module 304 is connected to the server 303 via Ethernet and configured to receive the gauge judgment results and control the operating state of the vehicle according to the gauge judgment results.

Figure 4:
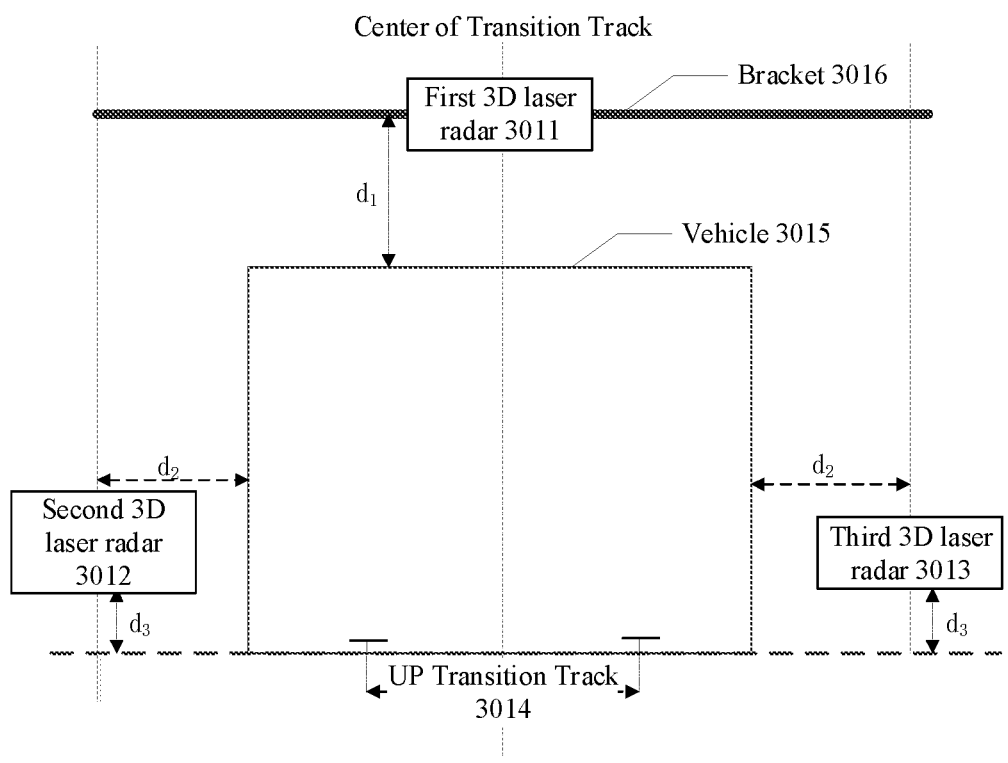
FIG. 4 shows a schematic diagram illustrating installation positions of three-dimensional laser radars in FIG. 3.

FIG. 4 shows a schematic diagram illustrating installation positions of the first group of three-dimensional laser radars in the embodiment of the present disclosure. FIG. 4 shows a plan view perpendicular to the ground plane and a running direction of the up transition track 3014. The first three-dimensional laser radar 3011 is disposed above the up-link switch 3014. Specifically, the first three-dimensional laser radar is located at a predetermined distance $d_1$ above the top of the vehicle 3015, and the first three-dimensional laser radar is located right above a center of the up transition track. The first three-dimensional laser radar 3011 is mainly used to detect the three-dimensional contour image of the top of the vehicle.

The second three-dimensional laser radar 3012 and the third three-dimensional laser radar 3013 are respectively disposed on two sides of the up transition track. Specifically, the second three-dimensional laser radar 3012 and the third three-dimensional laser radar 3013 are arranged symmetrically with respect to a central axis of the transition track, and both the second three-dimensional laser radar 3012 and the third three-dimensional laser radar 3013 are located at a second distance $d_2$ from the outside of the vehicle 3015.

The second three-dimensional laser radar 3012 and the third three-dimensional laser radar 3013 are mainly used to detect the three-dimensional contour images of two outer walls of the vehicle.

Both the second three-dimensional laser radar 3012 and the third three-dimensional laser radar 3013 are located at a third predetermined distance $d_3$ from the ground. The first three-dimensional laser radar 3011, the second three-dimensional laser radar 3012, and the third three-dimensional laser radar 3013 are all mounted on a bracket 3016.

Optionally, the value of $d_1$ ranges from 2 m to 3 m; the value of $d_2$ ranges from 1 m to 1.2 m; the value of $d_3$ ranges from 1 m to 1.2 m. The ranges of $d_1$, $d_2$, and $d_3$ are not specifically limited in the embodiments of the present disclosure, as long as the first three-dimensional laser radar, the second three-dimensional laser radar, and the third three-dimensional laser radar can detect the complete contour of the vehicle.

In the embodiment of the present disclosure, the laser scanning surfaces of all the three-dimensional laser radars have a field angle of 96°, and the maximum detection distance of all the three-dimensional laser radars is 50 m. The parameters of the three-dimensional laser radars are not specifically limited in the embodiments of the present disclosure.

Optionally, an emission device of the three-dimensional laser radar faces the direction in which the vehicle comes along the transition track, and there is an acute angle of 45° between an optical axis direction of the three-dimensional laser radar and the rail direction. By configuring an installation angle of the three-dimensional laser radar, both a scanning range of the three-dimensional laser radar and an area size of the acquired three-dimensional contour images can be taken into account, and meanwhile, the sharpness and easy resolution of the acquired images can be ensured.

In the embodiment of the present disclosure, the server 303 is installed in an equipment room of the depot, and connected with the first group of three-dimensional laser radars 301 and the second group of three-dimensional laser radars 302 through the optical fibers.

The specific installation positions of the second group of three-dimensional laser radars 302 mounted on the down transition track may be configured with reference to FIG. 4, as long as being consistent with the positions of the first group of three-dimensional laser radars 301 in the up transition track, which is not repeated here. That is, the fourth three-dimensional laser radar is disposed above the down transition track; the fifth three-dimensional laser radar and the sixth three-dimensional laser radar are respectively disposed on two sides of the down transition track.

The number and the installation positions of the three-dimensional laser radars are not specifically limited in the embodiments of the present disclosure, as long as the detection of the complete three-dimensional contour of the vehicle can be realized.

Other details of the system for detecting the gauge of the metro vehicle according to the embodiments of the present disclosure are similar to the method for detecting the gauge of the metro vehicle according to the embodiments of the present disclosure as described above with reference to FIG. 1, and these details are not described herein again.

The present application may be embodied in other specific forms without departing from its spirit or essential characteristics. It should be understood by those of ordinary skill in the art that the present embodiments are to be considered in all respects as illustrative and not restrictive, the scope of the present disclosure is defined by the appended claims rather than the foregoing description, and all changes that come within the meaning of the claims and their equivalents are therefore to be included within the scope of the present disclosure.

What is claimed is:

1. A method for detecting a gauge of a metro vehicle, comprising:
    obtaining a plurality of partial three-dimensional contour images and a first identification information of the vehicle during a course of the vehicle passing through a transition track;
    processing the plurality of partial three-dimensional contour images of the vehicle to get a complete three-dimensional contour image of the vehicle;
    determining a gauge judgment result of the vehicle according to the first identification information, a preset gauge standard image library and a complete three-dimensional contour image of the vehicle;
    sending the gauge judgment result of the vehicle to an Automatic Train Supervision (ATS) module;
    controlling, via the ATS module, the vehicle to pass through the transition track when the gauge judgment result is normal; and
    controlling, via the ATS module, the vehicle to stop passing through the transition track when the gauge judgment result is abnormal.

2. The method of claim 1, wherein the obtaining the plurality of partial three-dimensional contour images and the first identification information of the vehicle during the course of the vehicle passing through the transition track comprises:
    obtaining the plurality of partial three-dimensional contour images of the vehicle that are detected by a laser scanning surface emitted by a three-dimensional laser radar during the course of the vehicle passing through the transition track; and
    receiving the first identification information of the vehicle transmitted by the ATS module, wherein the first identification information of the vehicle includes a model number of the vehicle.

3. The method of claim 2, wherein before obtaining the plurality of partial three-dimensional contour images of the vehicle that are detected by the laser scanning surface emitted by the three-dimensional laser radar during the course of the vehicle passing through the transition track, the method further comprises:
    receiving a signal sent by the ATS module indicating the vehicle enters the transition track; and
    sending the signal to the three-dimensional laser radar.

4. The method of claim 1, wherein the processing the plurality of partial three-dimensional contour images of the vehicle to get the complete three-dimensional contour image of the vehicle comprises:
    stitching the plurality of partial three-dimensional contour images of the vehicle to get the complete three-dimensional contour image of the vehicle.

5. The method of claim 1, wherein the determining the gauge judgment result of the vehicle according to the first identification information, the preset gauge standard image library and the complete three-dimensional contour image of the vehicle comprises:
    obtaining a gauge standard image corresponding to the vehicle from the gauge standard image library according to the first identification information of the vehicle;
    comparing the complete three-dimensional contour image of the vehicle with the gauge standard image corresponding to the vehicle to determine a differential region between the complete three-dimensional contour image of the vehicle and the gauge standard image corresponding to the vehicle; and determining the gauge judgment result of the vehicle based on a surface area and/or a volume of the differential region or based on a dimension of the differential region.

6. The method of claim 1, wherein the controlling, via the ATS module, the vehicle to stop passing through the transition track when the gauge judgment result is abnormal comprises:
controlling, via the ATS module, the vehicle to stop passing through the transition track and enter a depot for maintenance; or
controlling, via the ATS module, the vehicle to stop passing through the transition track, so that a gauge detection is to be performed for the vehicle again after maintenance of the vehicle on the transition track.

7. The method of claim 1, wherein after getting the complete three-dimensional contour image of the vehicle, the method further comprises:
identifying the complete three-dimensional contour image of the vehicle by an image identification process; and
assigning identification information to the vehicle according to an identified result.

8. The method of claim 7, wherein after assigning the identification information to the vehicle according to the identified result, the method further comprises:
obtaining a vehicle number of the vehicle; and
storing the complete three-dimensional contour image of the vehicle in a database according to the vehicle number and the identification information of the vehicle, wherein the database comprises complete three-dimensional contour images of all detected vehicles.

9. The method of claim 8, wherein when the gauge judgment result of the vehicle is normal, after storing the complete three-dimensional contour image of the vehicle in the database, the method further comprises:
performing a failure prediction for the vehicle according to the database and a big data analysis process; and
sending a failure prediction result to the ATS module.

10. The method of claim 1, wherein the gauge standard image library comprises complete three-dimensional contour images of normal vehicles having different first identification information when running at a preset constant speed.

11. The method of claim 10, wherein the gauge standard image library comprises a first gauge standard image sub-library and a second gauge standard image sub-library,
wherein the first gauge standard image sub-library comprises complete three-dimensional contour images of the normal vehicles having the different first identification information when running at a first preset constant speed; and the second gauge standard image sub-library comprises complete three-dimensional contour images of the normal vehicles having the different first identification information when running at a second preset constant speed.

12. A system for detecting a gauge of a metro vehicle, comprising a three-dimensional laser radar, a server and an Automatic Train Supervision (ATS) module, wherein:
the three-dimensional laser radar is configured to detect a plurality of partial three-dimensional contour images of the vehicle by using an emitted laser scanning surface during a course of the vehicle passing through a transition track, and send the plurality of partial three-dimensional contour images of the vehicle to the server;
the server is configured to obtain the plurality of partial three-dimensional contour images and a first identification information of the vehicle during the course of the vehicle passing through the transition track, process the plurality of partial three-dimensional contour images of the vehicle to get a complete three-dimensional contour image of the vehicle, determine a gauge judgment result of the vehicle according to the first identification information, a preset gauge standard image library and a complete three-dimensional contour image of the vehicle, and send the gauge judgment result of the vehicle to the ATS module; and
the ATS module is configured to receive the gauge judgment result of the vehicle and send the first identification information of the vehicle to the server, control the vehicle to pass through the transition track when the gauge judgment result is normal, and control the vehicle to stop passing through the transition track when the gauge judgment result is abnormal.

13. The system of claim 12, wherein the system comprises a first group of three-dimensional laser radars and a second group of three-dimensional laser radars, and the transition track comprises an up transition track and a down transition track;
the first group of three-dimensional laser radars are configured to detect a plurality of partial three-dimensional contour images of the vehicle during a course of the vehicle passing through the up transition track; the second group of three-dimensional laser radars are configured to detect a plurality of partial three-dimensional contour images of the vehicle during a course of the vehicle passing through the down transition track;
the first group of three-dimensional laser radars and the second group of three-dimensional are connected with the server.

14. The system of claim 13, wherein the first group of three-dimensional laser radar comprises a first three-dimensional laser radar, a second three-dimensional laser radar and a third three-dimensional laser radar;
wherein the first three-dimensional laser radar is disposed above the up transition track;
the second three-dimensional laser radar and the third three-dimensional laser radar are respectively disposed at two sides of the up transition track;
the second group of three-dimensional laser radar comprises a fourth three-dimensional laser radar, a fifth three-dimensional laser radar and a sixth three-dimensional laser radar;
wherein the fourth three-dimensional laser radar is disposed above the down transition track;
the fifth three-dimensional laser radar and the sixth three-dimensional laser radar are respectively disposed at two sides of the down transition track.

* * * * *